(12) United States Patent
Schildermans et al.

(10) Patent No.: US 6,671,070 B1
(45) Date of Patent: Dec. 30, 2003

(54) COVERAGE-AREA GAIN COMPENSATION FOR HIGH RESOLUTION PRINTING

(75) Inventors: Luc H. M. L. Schildermans, Ghent (BE); Jan Van Laethem, Antwerp (BE); Hans De Stecker, Lochristi (BE)

(73) Assignee: Dotrix N.V., Ghent (BE)

( * ) Notice: Subject to any disclaimer, the term of this patent is extended or adjusted under 35 U.S.C. 154(b) by 0 days.

(21) Appl. No.: 09/412,874

(22) Filed: Oct. 5, 1999

(51) Int. Cl.[7] .................................................. G06K 9/42
(52) U.S. Cl. ........................ 358/1.9; 382/256; 382/258
(58) Field of Search ................. 358/1.1, 1.9; 382/256, 382/258

(56) References Cited

U.S. PATENT DOCUMENTS

| | | | | |
|---|---|---|---|---|
| 4,010,446 A | * | 3/1977 | Kawa | 382/258 |
| 5,204,752 A | * | 4/1993 | Yamakawa | 358/296 |
| 5,805,740 A | * | 9/1998 | Takagi et al. | 382/257 |
| 5,841,954 A | * | 11/1998 | Ackley | 358/1.8 |
| 6,081,340 A | * | 6/2000 | Klassen | 358/1.1 |
| 6,084,684 A | * | 7/2000 | Hamburg et al. | 358/1.9 |
| 6,270,186 B1 | * | 8/2001 | Smith et al. | 347/41 |

FOREIGN PATENT DOCUMENTS

EP     1 122 690     *   8/2001

* cited by examiner

*Primary Examiner*—Thomas D Lee
(74) *Attorney, Agent, or Firm*—Dov Rosenfeld; Inventek

(57) ABSTRACT

A method of and system for compensating artwork for coverage gain that occurs during reproducing of the artwork on a reproduction system. The artwork includes one or more graphic elements. The method includes characterizing the reproduction system, selecting one or more graphic elements of the artwork, and automatically modifying the artwork by causing a spread or choke to the selected graphic elements of the artwork by an amount determined according to the results of the characterization step. Reproducing the modified artwork on the reproduction system reduces the coverage gain effects.

33 Claims, 6 Drawing Sheets

COVERAGE-AREA GAIN COMPENSATION FOR HIGH RESOLUTION PRINTING

FIELD OF INVENTION

This invention relates to the field of graphic arts, and in particular to a method and system that compensates for coverage-area spread distortions that occur during printing.

BACKGROUND

Image Reproduction

The field of graphic arts deals with the reproduction, for example the printing of images, and with the preparation of images for such reproduction. In recent years, the process of preparing data for printing has been computerized, so that image data is typically prepared on a computer by combining the image elements, which might include scanned or digitally acquired photographs and digitally designed graphic elements. Image data thus may include linework and continuous tone images, and therefore may include areas that have various tones. The color at any point in an image is represented by a set of color components, may be the quantities of inks or toners that will be used for printing (e.g., cyan, magenta, yellow, and black) or in some other component system which eventually will need to be converted ("separated") into the ink values for printing. Such other components include red, green and blue components (RGB) and other color co-ordinate schemes (e.g., CIE-Lab). Thus, color images are represented by a set of monochrome component images, each representing the amount of one of the color component. When these components are the quantities of inks or toners, the monochrome component images are called separations.

Most printing processes (e.g., offset press, gravure, flexography) are usually capable of printing only two tones of any ink or toner, i.e., either deposit or not deposit ink or toner onto a substrate or carrier, which is usually but not necessarily a sheet of paper. Halftoning is used to reproduce images having continuous tones. Halftoning converts varying values of tints and tones into a geometric distribution of small objects (e.g., dots) that can be printed. The human eye "spatially integrates" these small objects over a larger area so that one perceives continuous tones when viewing the image from a distance. The most common form of halftoning uses small dots, with either the size of the dots or the frequency of dots per unit area varying to provide for different grey tones. Halftoning using dots is called traditional halftoning herein.

The steps in the reproduction of an image may include recording the separations of the image on film using a recorder such as an imagesetter, then making a set of plates from the film. Alternatively, a plate may be directly exposed. Other forms of reproduction include flexography, gravure, and direct imaging onto the substrate using electro-photography, for example, xerography. In all these cases, the image is usually converted to picture elements (pixels) which are used to modulate a light source (e.g., a laser) to expose some photosensitive medium. The pixels are usually organized in a raster.

The image data ("artwork") may be available directly in pixel form, or may be provided in some other format, for example, as a page description language (PDL) file such as a PostScript® file (Adobe Systems Incorporated, San Jose, Calif.), or in some other object-oriented format. Any of these non-pixel formats needs to be converted into a raster stream of pixels prior to exposure, and this conversion process is called raster image processing (RIPping). The device for performing RIPping is called a raster image processor (RIP), and typically comprises a computer running RIP software. Halftoning may be carried out during RIPing, prior to RIPping, or even after RIPing.

Some forms of printing require high accuracy. One example is the printing of security documents such as banknotes, travelers checks, and share certificates, in which the artwork is extremely precise.

Coverage Area Spread Distortions

There typically are deviations in the appearance of a print of reproduced artwork from what is expected. One of these deviations is due to a spread in the area of ink coverage of solid objects. This distortion occurs as a result of making a printing plate (if used) and as a result of the printing process itself. It is called "coverage-area gain," "coverage area spread," or simply "coverage-gain" herein, and is present in most printing processes, including lithography, flexography, gravure printing, and even in electro-photography (xerography).

Explanations for the effect include the spread that occurs when an amount of ink is applied to a reasonably large area and then pressed onto the substrate or carrier during printing. The thickness of the ink is then forced over the edges of the area over a small distance. Depending on the printing process, other elements such as ink transfer efficiency, ink absorption in the paper, and optical characteristics of the ink/paper combination can also influence the amount of coverage gain. Sharp inward or outward image edges will tend to fill in or to disappear, so the shape of the ink coverage area is another factor.

The effect of coverage gain is to reduce accuracy of printing, and this is especially noticeable when printing small elements. For example, this is commonly noticeable in halftone printing, where the effect is called "dot gain." When printing a single small dot, for example, a small circular area, the radius of the area will increase by some small distance. Therefore, if one attempts to reproduce a halftone region of a certain coverage percentage, the effect will be to increase the perceived coverage percentage. This causes a shift in the grey scale, and in the case of color images, a shift in the tone.

Dot gain compensation is a technique commonly used to compensate for the dot gain by reducing the input area coverage prior to printing. This typically is done electronically using a lookup table that maps desired dot percentage to what dot percentage to apply in order for the desired dot percentage to be achieved. The lookup table may be generated by printing step wedges of desired coverage percentages and measuring the resulting coverage percentages after imagesetting and printing.

While traditional halftoning, the most common form of halftoning, uses small dots, with either the size of the dots or the frequency of dots per unit area varying to provide for different grey tones, other forms of halftoning also are known that use small graphic elements of varying size or frequency that are not dot-like. Non-traditional halftoning schemes include:

halftoning using thin lines segments that have different thicknesses. Such techniques are common in the design of security documents such as banknotes. See, for example, the image of George Washington in the common United States one dollar bill;

halftoning using character fonts; and

Halftoning using any other small elements arranged so that the average ink coverage per unit area is modulated according the grey scale.

Lookup table coverage gain compensation techniques such as commonly used for dot gain compensation are not very effective for compensating for the coverage gain in most non-traditional halftoning techniques.

Thus there is a need in the art for applying coverage gain compensation to the graphic elements used for non-traditional halftoning to account for the coverage gain that occurs on such elements in the reproduction process.

Coverage gain effects are known also to cause problems when printing a barcode comprising lines of varying width. Barcodes are used, for example, to print universal product codes (UPCs). Thus, artwork, for packaging for example, may comprise a is barcode. Coverage gain effects may cause bars that are too closely spaced to merge, leading to error in reading the barcode. The "Film Master Method" of verification of barcodes is known which includes exposing a film master positive or negative image of a test symbol having several lines of varying widths with smaller and smaller gaps between the lines, followed by precise measurement of the film master positive or negative image using light transmitted through the film. The "bar-width-reduction" parameter is determined as half the width of the gap that first gets filled up. Barcode verification systems that use film master methods are made, for example, by RJS, Inc., a subsidiary of Printronix, Inc., Santa Fe Springs, Calif. When a bar code element is included in artwork using a graphic design program, such as packaging application oriented graphic design programs, the user typically specifies the barcode, the scale of the barcode, and the bar-width-reduction parameter. The design system simply inserts the barcode element with the bar widths of the lines in the barcode reduced by twice the value of this parameter, leaving the length unaffected.

Another application where coverage gain effects are important is the printing of security documents. Such security documents may be made up of many line segments and may contain areas that are halftoned using non-traditional techniques. The reproduction of such documents is required to be highly accurate even in non-halftone areas. Such line elements typically may be thin, and so may be noticeably affected by coverage gain. For this reason, in the past, identical denomination currency bills were printed on the same or very a similar press, and manual adjustments were made to ensure minimum variability. However, it is now desired to print artwork supplied in digital form on different presses, on different batches of the same paper using different batches of the same inks. For example, it is desired to be able to print acceptable Euros (the new currency of Europe) in different countries on different presses. The different countries, for example, may customize one side of each banknote. Each press might produce a different amount of coverage area gain, which would result in images that don't have the same appearance. It is desired to correct for the coverage area gains to make all such images of the same artwork reproduced on different presses appear the same, such appearance matching the expected appearance in print.

Coverage gain effects can be measured experimentally. Such experiments have shown that for large enough areas, larger than about 100 $\mu$m in extent for high quality reproduction on high quality paper, coverage gain can be modeled by the perimeter of the area moving a fixed linear distance away. We call this distance the "smear distance" or "spread distance." For example, reproducing a rectangle of A $\mu$m by B $\mu$m produces a rectangle of $(A+\Delta x)$ $\mu$m by $(B+\Delta x)$ $\mu$m, and reproducing a circular area of radius r $\mu$m produces a circular ink area of radius $(r+\Delta x)$ $\mu$m, where $\Delta x$ is the smear distance, in $\mu$m. Typical smear distances are from 1 $\mu$m to 200 $\mu$m. In practice, smear distances may vary by as much as 50 $\mu$m from printing press to printing press of similar type for the same paper and ink. Different types of printing presses may lead to variations between presses as large as 200 $\mu$m. For high resolution work such as encountered in security printing, a smear distance as small as 1 $\mu$m may be significant. Electronically compensating for such effects requires an imagesetter of extremely high resolution, and such imagesetters are only now coming to market. For example, the Barco Graphics SECUSETTER™ and SILVERWRITER™ imagesetters (Barco Graphics, Gent, Belgium, the assignee of the present invention), are capable of resolution of up to 20,000 lines per inch (lpi), and can thus be adjusted by 1.25 $\mu$m.

While the coverage area gain effects typically produce larger areas, it is also possible that such effects produce a negative gain, that is, an area that is smaller in reproduction than desired. This may occur, for example, using negative plates. It also may occur when in the artwork, small white areas are on top of a dark printed background. Thus the white areas are made smaller by the spread of the darker background, leading to a negative coverage gain in the white areas. It therefore is to be understood that coverage area gain may be positive or negative.

There thus is a need for a method that compensates for coverage gain effects by automatically enlarging or reducing the area around graphic elements that would be reproduced without such compensation. So enlarging an area is called spreading or applying a spread, and so reducing the area is called choking or applying a choke.

While a coverage gain compensation technique called dot gain compensation is known for traditionally halftoned areas included in artwork, and a simple line-width compensation technique is known for compensating a barcode element included in artwork, there still is a need in the art for coverage gain compensation techniques that can compensate for coverage area gain effects for all types elements in the artwork, including small linework elements such as small elements used for non-traditional halftoning. There also is a need for a method that can be implemented electronically for compensating for coverage area effects by selecting elements that are candidates for coverage gain effects, and automatically applying a choke or spread by an appropriate amount to the elements. There also is a need for a method that can compensate for coverage area effects that are in the range of 1 to 200 $\mu$m.

When reproducing very small segments, those that have a local thickness, e.g., less than about 50 $\mu$m, on a high quality, high resolution press on high quality paper, the constant smear distance model is no longer accurate; and the smear distance becomes dependent on the local thickness of the segment.

Thus there is not only a need for an apparatus and method that can compensate for coverage area gain effects that are modeled by a constant spread distance, but also for coverage area gain effects that are dependent on the local thickness or shape.

SUMMARY

It is a broad object of the invention to provide a method to compensate for coverage gain effects that occur during the reproduction of linework having solid ink coverage.

A feature of the method of the invention is that it can be implemented electronically to automatically compensate for coverage gain effects.

Another feature of the method of the invention is that it can compensate for coverage gain effects that are in the range of 1 to 200 $\mu$m.

Another feature of an embodiment of the invention is that it uses the imaging ability of very high resolution imagesetters.

Another feature of the invention is a method able to compensate for coverage gain that occurs on graphic elements used for non-traditional halftoning in the reproduction process, thereby providing a method of compensating for coverage gain regions of artwork other than regions halftoned by traditional means.

A feature of one embodiment of the invention is providing a method that can compensate for coverage area gain effects that are modeled by a constant spread distance.

A feature of another embodiment of the invention is providing a method that can compensate for coverage area gain effects that are dependent on the local thickness or curvature of an element.

To summarize, one form of the invention is a method of compensating artwork for coverage gain that occurs during reproduction of the artwork on a reproduction system, the artwork including one or more graphic elements, the method comprising: characterizing the reproduction system; and modifying the artwork by causing a spread or choke to one or more selected graphic elements of artwork by an amount determined according to the results of the characterization step. By causing a spread and choke is meant that a spread and choke will eventually be applied to the element somewhere in the design and reproduction chain. Thus one way of causing a spread and choke is to mark an element for later modification of its perimeter, and another is to directly modify the element's perimeter. Reproducing the modified artwork on the reproduction system thus reduces the coverage gain effects.

In one embodiment, the selected graphic elements are linework elements, such linework elements being, for example, the elements of a non-traditional halftoning technique.

In one implementation, the artwork comprises pixel data, and the step of modifying further comprises: identifying regions of constant ink value in the pixel data, and causing a spread or choke on the graphic elements defined by the regions, where in this case, the causing of a spread or choke is by directly changing the area of the regions.

In another implementation, the artwork is provided in an object-oriented graphic format, and reproducing the artwork includes RIPping the artwork. In such an implementation, the causing of the spread or choke of an element includes marking the element for enlargement or contraction during RIPping. Alternatively, causing the spread or choke of an element may includes directly enlarging or contracting the boundaries of the element. In yet another version, causing the spread or choke of an element comprises adding a stroke attribute to the contour of an element not having the stroke attribute, or, for an element that has a contour with a stroke attribute, modifying the stroke attribute of the contour of the element.

Typically, the choke or spread is by a linear amount in the range of 1 to 200 $\mu$m throughout the perimeter. More specifically, the choke or spread is by an amount in the range of 1 to 50 $\mu$m.

In the preferred embodiment, the reproduction system includes a very high resolution imagesetter.

In one version, the characterizing step determines a fixed smear distance for each ink of the reproduction system, and the modifying step includes selecting as the selected elements all linework elements of constant ink value, and causing the spread or choke by the fixed smear distance for each particular ink and for each selected linework element of the particular ink.

In another version, the characterizing step determines a relationship between the smear distance for each ink of the reproduction system and the local thickness of a line element of constant ink value, and the modifying step determines, for each particular ink and for each selected linework element of the particular ink, the local thickness of the linework element at each location of the linework element. The causing of the spread or choke is by the smear distance for the particular ink for the determined local thickness.

Another aspect of the invention is providing a design system for preparing artwork for reproduction on a reproduction system. The design system includes a computer, a graphic design program for producing artwork for reproduction from input data including a set of one or more graphic elements, and a coverage gain compensation program connected to the graphic design program and configured to cause a spread or choke to one or more selected graphic elements of the set of graphic elements thereby compensating the coverage gain effects of reproducing the selected elements.

Other features and properties will be clear from the detailed description that follows.

DESCRIPTION OF THE DRAWINGS

In order to better show the features of the invention, without any limitation implied therein, several preferred embodiments of the invention are described in greater detail, with reference to the enclosed drawings in which.

DESCRIPTION OF THE PREFERRED EMBODIMENTS

Referring first to FIG. 1, FIG. 1 shows a typical reproduction system 100. The present invention may be beneficially used to compensate for the coverage gain effects of reproduction system 100, which is aimed at high quality security printing of security documents such as banknotes (currency), traveler checks and security certificates. The reproduction system 100 reproduces artwork 102 by printing artwork 102 on a printing press 116 to produce a print 116 on a particular substrate, typically high quality paper for security printing, using a set of colorants, typically inks. While reproduction system 100 is labeled prior art, such a system is not prior art when it incorporates an embodiment of the invention for compensating for coverage gain effects. Note that the term reproduction system includes the particular substrate and the particular set of inks used for reproduction.

Figure 1A:
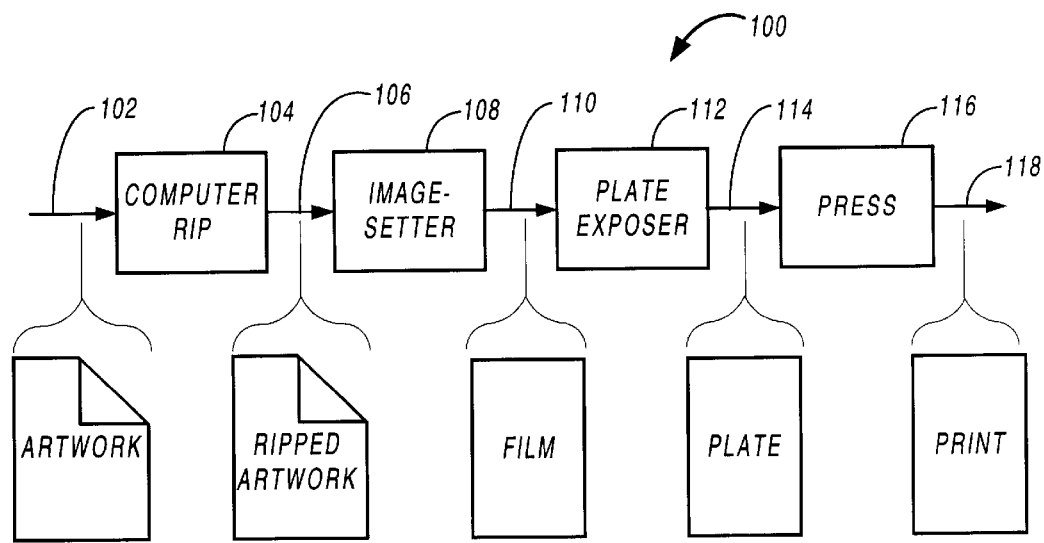
FIG. 1A shows a typical reproduction system which can be compensated using an embodiment of the invention.
Figure 1B:
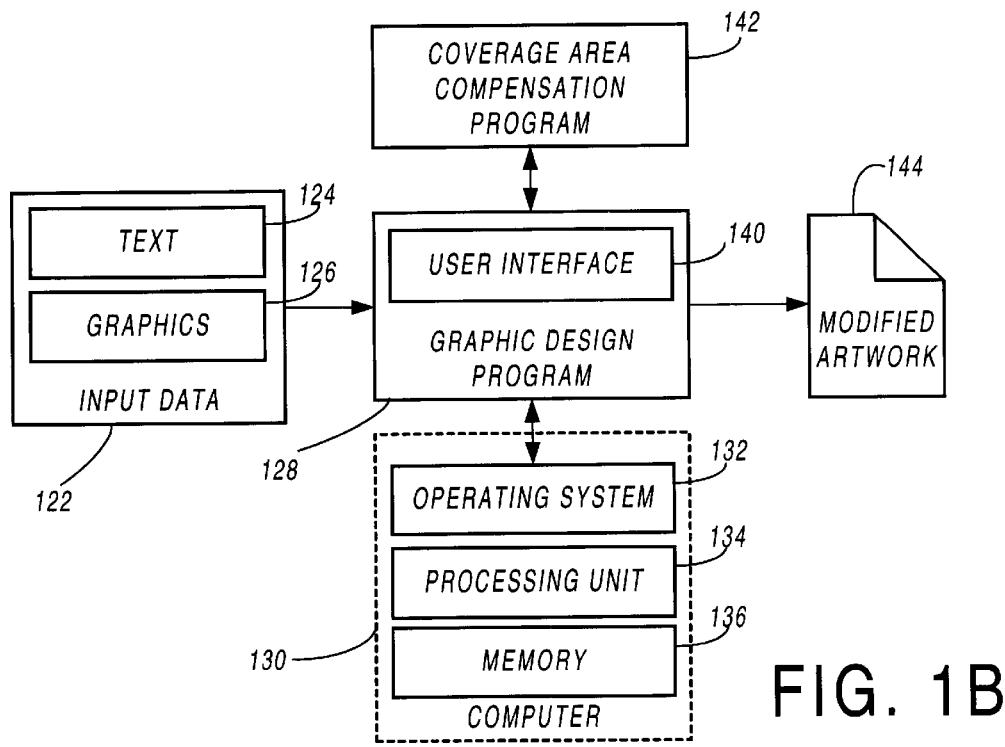
FIG. 1B is a block diagram of a design system that includes a coverage gain compensation program in accordance with the invention that works in conjunction with prior art graphic design programs to compensate artwork for the converge gain effects of the reproduction system.

An embodiment of a design system which includes a coverage gain compensation program 142 in accordance with the invention is illustrated in FIG. 1B. The coverage gain compensation program 142 works in conjunction with a computer program, such as a graphic design program 128, that is suitable for incorporating text, graphics and other aspects of documents to be reproduced. The graphic design program 128 may be, for example, the Fortuna® Security document graphic design program sold and supported by Barco Graphics NV, of Gent, Belgium, the assignee of the present invention. It is noted, however, that the benefits of the invention are not limited to use with an application whose primary purpose is printing security documents. Thus, throughout the specification and claims, the term "graphic design program" is hereby defined as any computer program that has the ability to manipulate graphic objects, including programs such as desktop publishing, presentation, art, and drawing programs.

The coverage area compensation and graphic programs 142 and 128 run on a processing unit 134 controlled by an operating system 132. Memory 136 is connected to the processing unit and generally comprises, for example, random access memory (RAM), read only memory (ROM), and magnetic storage media such as a hard drive, floppy disk, or magnetic tape. The processing unit and memory are typically housed within a personal computer or computer workstation 130. Operating system 132 may be a variant of the UNIX® operating system or a windowing environment such as Microsoft Windows®.

The graphic design program 128 includes a user interface 140 that interacts between the operating system 132 and the internal process application of the graphic design program 128. Using the graphic design program 128, an author creates the artwork (text, images, and graphics) using data of text, images, and graphics as input. Text, images and graphics are generically referred to as "objects" or graphic elements through the specification and claims. In many cases, some of the input data for incorporating into the artwork is imported from one or more sources including, for example, illustration, image enhancement, word processing, and desktop publishing programs. At block 122, input data including text 124 and graphics 126 that were created within or imported into the system are shown. Once the input data for the artwork have been entered, the author uses the graphic design program to form the artwork. The graphic elements for use in the artwork may be modified by the coverage gain compensation program 142 to produce modified artwork 144. This modification may be carried out automatically, or, in interactively, the mode selected by the user. In interactive mode, those elements selected by the coverage area compensation program 142 for modification, and the proposed modification, are displayed to the author on user interface 140 prior to modification. The author may then change the selection of which elements are to be modified by removing some elements, and including other elements. The author also may modify the nature of the proposed modification. Following such interactive editing by the author, the modifications proceed automatically.

The original artwork preferably is provided in an object-oriented graphic format called GRS™ Barco Graphics, NV, Gent, Belgium, the assignee of the present invention, which is an extension of GRO™, the native internal format used by Barco Graphics. GRS is an extension of GRO that is used in design applications, and includes such concepts as the grouping of graphic elements. It will be appreciated by those in the art that the invention is not limited to providing art work in GRS. Alternatively, the artwork may be provided in a page description language (PDL) such as PostScript® from Adobe Systems Incorporated, San Jose, Calif. PostScript is also an object-oriented graphic format. A PostScript file for instance contains a sequential list of commands, which, when interpreted, generates graphic objects such as line work (including text), CT images, paths (a set of vector or spline segments that describes a shape or set of line segments), bounding boxes ("invisible" rectangles that define the boundaries of an object), etc. GRO and GRS are similarly formats that include such graphic objects. Paths may have attributes such as stroke and fill, and may define, among other things, bounds of objects, objects themselves, and clipping masks which, when associated with an object, define which part of the object is visible. Such concepts would be well known to those of ordinary skill in the art.

The invention is not even limited to artwork provided in an object-oriented graphic format such as Postscript, GRS, or GRO, and may alternatively be provided in pixel data form.

The artwork 102 in FIG. 1A, which might be modified artwork 144 from the system of FIG. 1B, thus preferably contains set of objects (called a display list). If the artwork is PostScript, the display list is obtained after interpreting. The artwork is rasterized (RIPped), preferably in a raster image processing computer 104 that runs raster image processing ("RIPing") software. Raster image processor ("RIP") computer 104 may be the same as computer 130, or could be a separate device.

The output of RIP computer 104 comprises rasterized artwork 106 which is input to an imagesetter 108. Imagesetter 108 exposes photographic film 110, and this film is then used to make an offset printing plate 114. The plate 114 is then used in printing press 116 to make one or more reproductions ("prints") of the artwork 102 on the substrate such as paper.

This invention is equally applicable to other forms of reproduction. For example, the imagesetter may directly expose a plate 114. Alternatively, rather than offset printing, flexography or gravure printing may be used. The invention also is applicable to direct printing, for example, electro-photography (xerography).

In the preferred embodiment, the imagesetter 108 is a very high resolution imagesetter, i.e., an imagesetter capable of very high resolution. Examples include the SECUSETTER™, capable of up to 10,000 lines per inch (lpi), and the SILVERSETTER™ (up to 20,000 lpi), both from Barco Graphics NV, Gent, Belgium, the assignee of the present invention. Such a very high resolution imagesetter is necessary for implementing very small modifications such as required for compensating for very small coverage gain effects, and for very small variation in coverage gain effects that may occur from press to press. Note that normally, the coverage gain effects may be in the range of 1 $\mu$m to 200 $\mu$m, and more specifically for very high resolution work, in the range of 1 $\mu$m to 50 $\mu$m. Variations from press to press may also be in the range of 1 $\mu$m to 50 $\mu$m.

Figure 2:
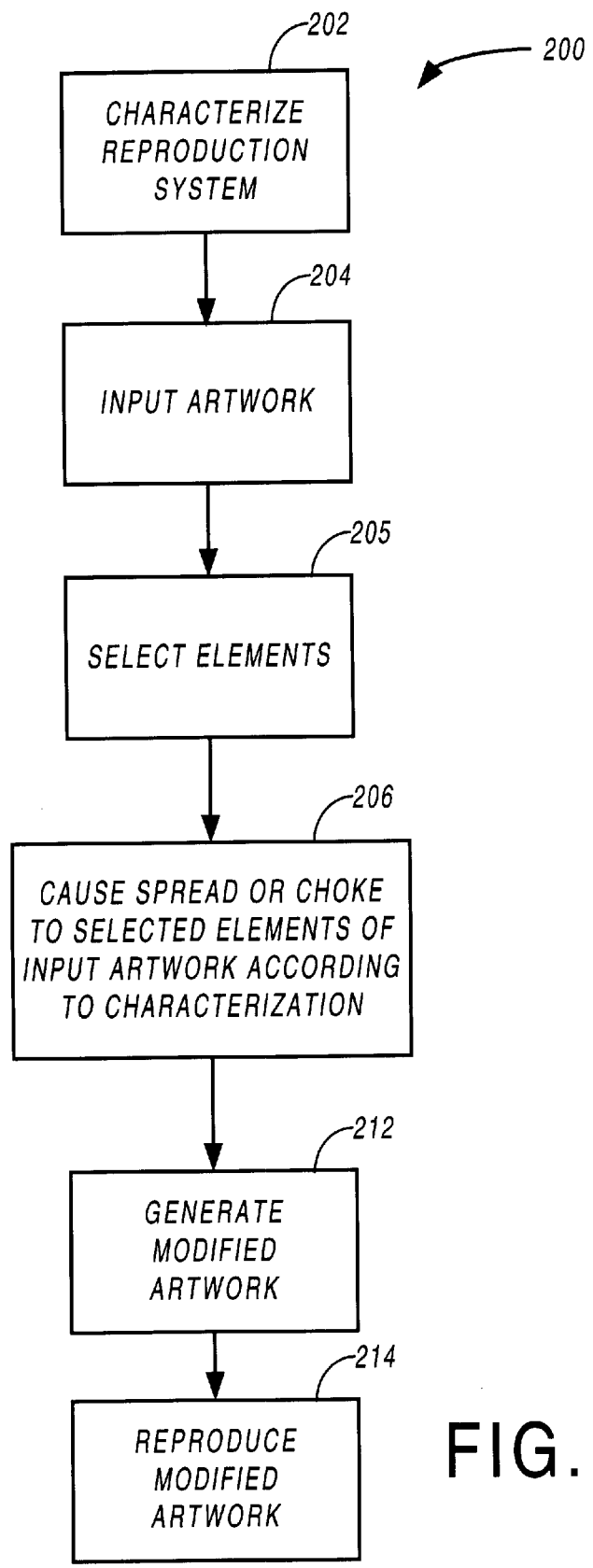
FIG. 2 shows a flowchart of the preferred embodiment of the inventive method for compensating for coverage gain effects.

FIG. 2 shows a flowchart of the preferred embodiment of the inventive method 200 for compensating for coverage gain effects. Method 200 includes characterization step 202 that characterizes the reproduction system such as system 100 by determine the smear distance. Step 204 inputs the artwork into the compensation system implemented by coverage area compensation program 142 as a set of instructions running on computer 130. Once the artwork is input and the smear distance is determined for the particular reproduction system, step 205 selects one or more graphic elements that are candidates for coverage area gain effects, and step 206 causes an enlargement (called a "spread" herein) or a contraction (called a "choke" herein) of the area of selected graphic elements. The operation is referred to as a "spread and choke" operation. Areas of ink coverage are choked to compensate for the coverage by the smear distance, while thin white linework elements are spread.

In the preferred embodiment, the actual enlargement or contraction of the elements occurs in the RIP. Modifying step 206 marks such elements for spread and choke. In other embodiments, Modifying step 206 may include the actual enlargement or contraction of the spread and choke. All these cases are referred to in the specification and claims as "causing" a spread or choke.

Step 206 usually is automatic. That is, once a criterion is established for step 205 of selecting the elements that are candidates for coverage gain during reproduction, the causing of the spread of choke is automatic. In one embodiment, selection step 205 also is automatic. In a variation, selection step 205 is interactive. The selection is displayed to the author (i.e., the user), who can subsequently modify which elements are selected. Once selected, again, the causing of the spread or choke is automatic.

The main application of the preferred embodiment is security printing, and artwork for security printing typically consists of only 100% solid (constant ink) linework elements, each printed with one or another of a set of inks. All the elements in such artwork are subject to (i.e., are candidates for) coverage gain effects, so in the preferred embodiment, step 206 causes the spread or choke on all graphic elements that are 100% solid constant ink linework.

Some of these solid elements, for example, may be the halftoning elements in a region of the artwork which is halftoned by a non-traditional technique.

In other applications, or even in some forms of security printing, the artwork might include areas that have less than 100% ink coverage using for traditional halftoning techniques. In a first improved implementation, such regions are compensated for by dot gain compensation according to methods known in the art. In a second improved implementation, in addition to areas traditionally halftoned being subject to dot-gain compensation, all borders of regions, including regions of less than 100% ink, are compensated for coverage gain effects, i.e., are subject to spread or choke by the characterization determined smear distance using an implementation of the inventive compensation method. In another improved implementation, the choke or spread distance depends on the ink percentage. In particular, the choke or spread distance for any ink is the characterization-obtained smear distance for that ink, reduced approximately in proportion with the local reduction in % ink fill.

Characterization

Figure 3A:
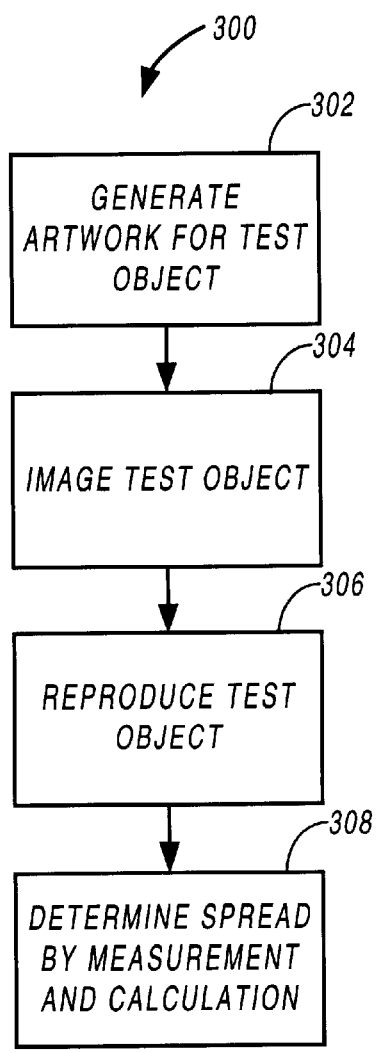
FIG. 3A shows one embodiment of the characterization step of the inventive method.
Figure 3B:
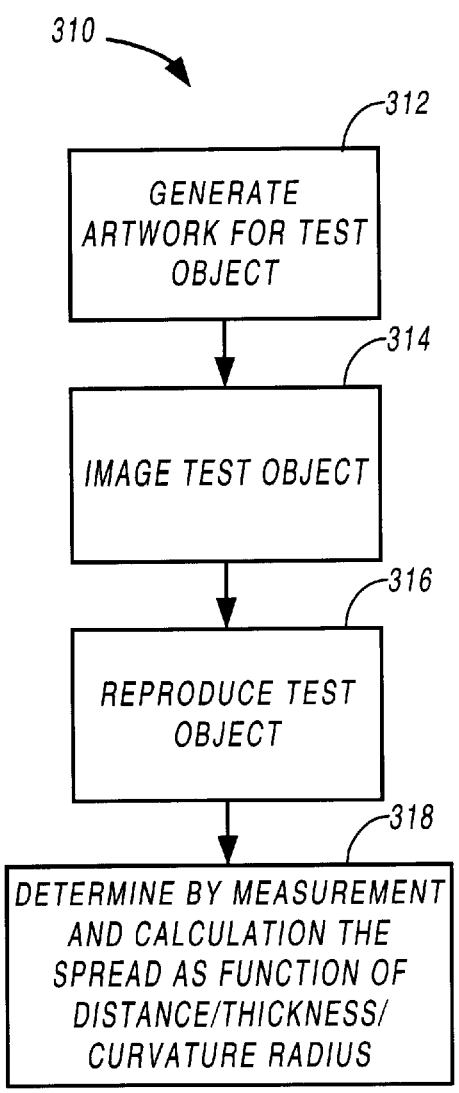
FIG. 3B shows another embodiment of the characterization step of the inventive method.

FIGS. 3A and 3B illustrate by flow-chart two embodiments 300 and 310 respectively, of characterization step 202. The first embodiment 300 shown in the flow chart of FIG. 3A determines the smear distance size for thin objects that are more than about 100 μm wide. In 302 the artwork for the test object is generated. A single smear distance is thus obtained for each ink (colorant) of the reproduction system on the particular paper of the particular reproduction system. This artwork is imaged (step 304) and reproduced (step 306) using the reproduction system 100 several times, once for each ink (colorant) for the particular paper of interest. Step 308 determines the spread distance and includes making one or more measurements on the reproduction of the test object. A single smear distance is thus obtained for each ink (colorant) of the reproduction system on the particular paper of the reproduction system.

Figure 4:
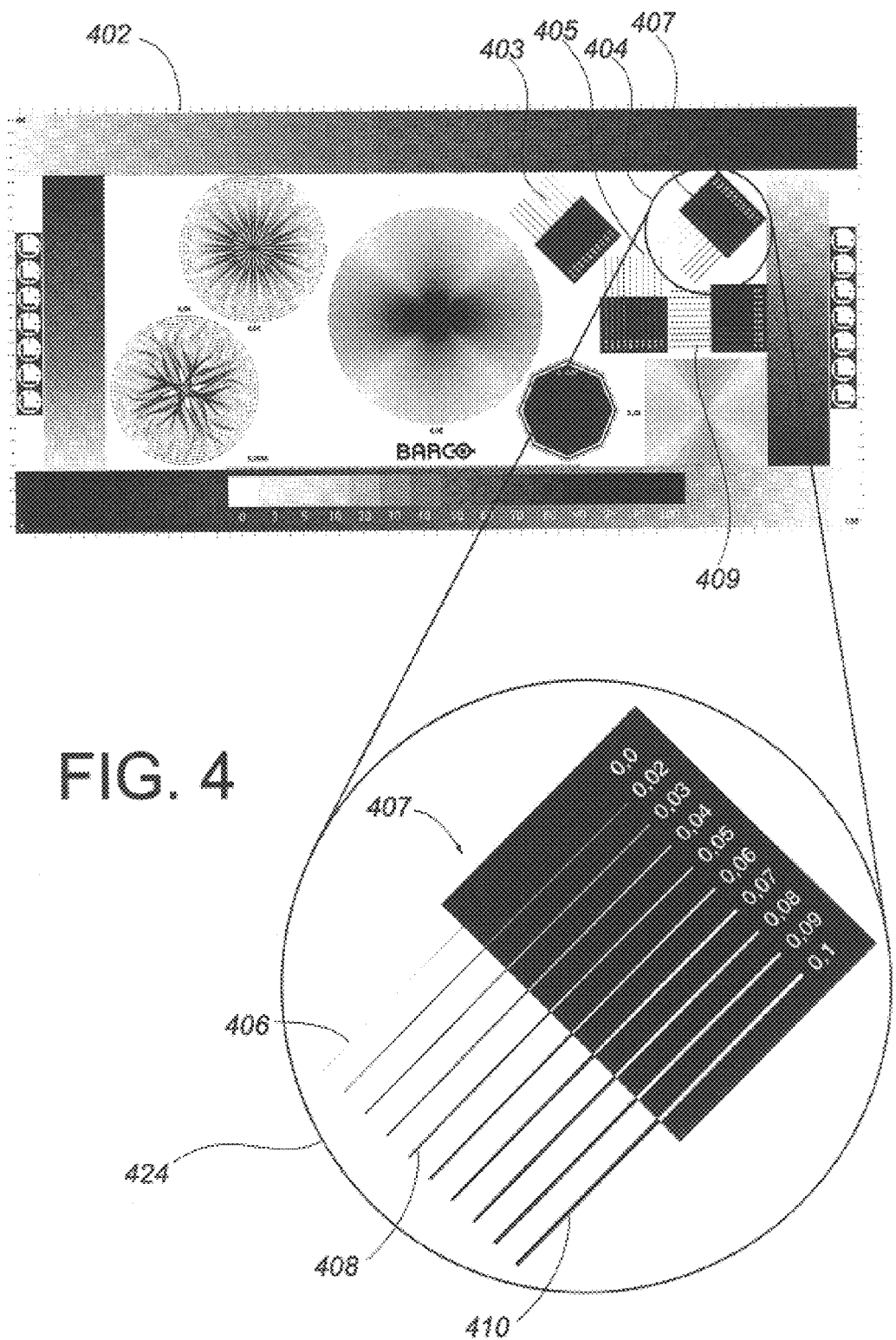
FIG. 4 shows a test object suitable for characterizing a reproduction system to determine one or more coverage gain effects.

FIG. 4 shows a test object 402 commonly used for testing a very high resolution reproduction system suitable for security printing. There are many elements in test object 402. In one embodiment of the invention, the elements 403, 405, 407, and 409 are used for determining the smear distance. Region 404 containing element 407 is shown enlarged as 424 in FIG. 4. Each of the elements 403, 405, 407, and 409 comprises several lines of varying thicknesses, each line having a positive (ink applied on a white background) and negative (no ink applied on a 100% ink background) segment. After imaging and reproducing test object 402, the thicknesses of the thickest positive and thickest negative line in each of the images of elements 403, 405, 407, and 409 are measured, preferably using a microscope. These are the measurements included in step 308. For example, the thicknesses of the positive and negative segments of line 410 are measured for test element 407. Several measurements are preferably taken at different points on each line. For each measurement, the absolute value of the difference between the measured thickness of the line and the designed thickness is determined. This is twice the smear distance. The average of all the measurements on all the test elements is obtained, and this value is used for the smear distance.

A single smear distance is thus obtained for each ink (colorant) of the particular reproduction system on the particular paper of the particular reproduction system.

Figure 5A:
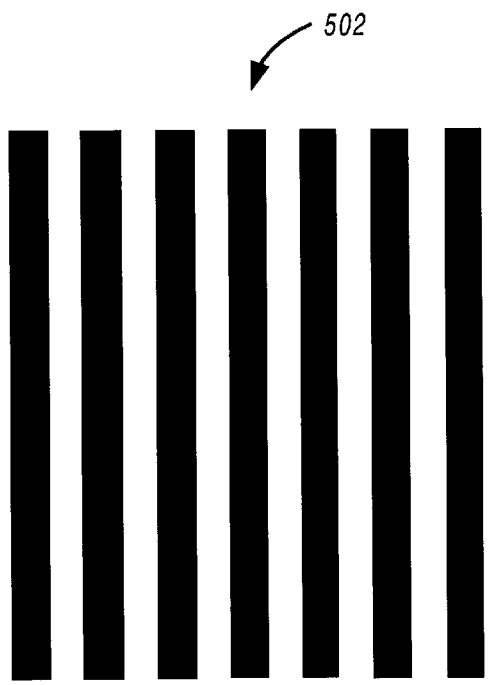
FIG. 5A, FIG. 5B and FIG. 5C show additional test objects suitable for characterizing a reproduction system for coverage gain effects.
Figure 5B:
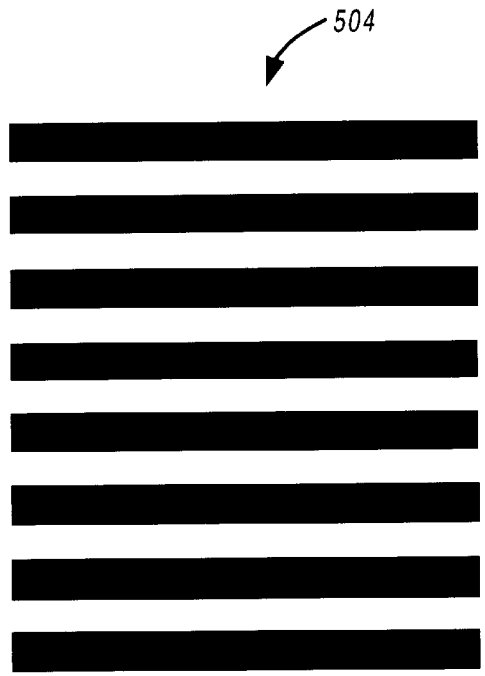
Figure 5C:
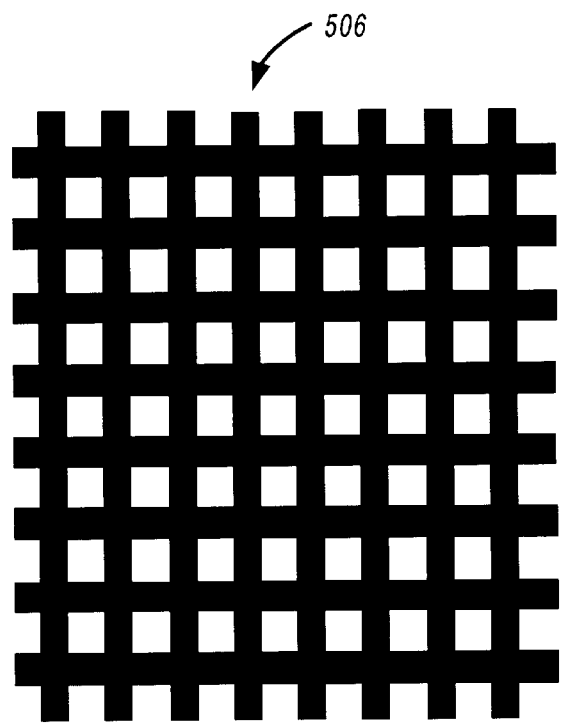

It would be clear that other test objects may be used. FIGS. 5A, 5B, and 5C show three alternate test objects. FIG. 5A shows horizontal ink-filled areas, FIG. 5B shows vertical filled lines, and FIG. 5C shows a grid pattern. Any of these may be images then reproduced for the inks and paper of reproduction system 100. In a first embodiment, step 308 of determining the smear distance includes measuring the thicknesses of the lines, preferably with a microscope. The smear distance estimate is obtained by calculating half the difference in thickness between the measured value and designed value. Again, several measurements may be averaged to improve the quality of the smear distance estimate.

Alternatively, test objects especially made for testing bar code printing may be used for characterizing the reproduction system, such test objects including lines of varying and known thickness whose width after reproduction may be measured and used to determine the smear distance.

According to an alternate embodiment, spread measurement step 308 comprises measuring a density rather than measuring one or more line thicknesses. The artwork for the test object for this embodiment is preferably a set of lines oriented to provide a nominal density, the orientation designed so that there is a relationship between line thicknesses and density, and thus, a relationship between the spread distance and any change in density from the nominal density. Test object 506 shown in FIG. 5C is one such object suitable for determining the smear distance by measuring density. To implement the characterization step, this test object is imaged and reproduced, and the density measured, preferably using a densitometer. Due to coverage gain effects, there will be a difference between the measured density and the nominal density. The estimate of the spread distance is determined from the difference in density from the nominal, and the relationship between spread distance and density or the particular pattern of the test object 506.

Applying the Correction

Artwork Format

In the preferred embodiment, the artwork is stored using the GRS™ object-oriented graphic format (Barco Graphics NV, Gent, Belgium, the assignee of the present invention), which is an hierarchical organized tree of graphic elements. Such graphic elements stored in the tree structure are called objects. An object may thus contain one or more other objects, which on their own may contain also one or more other objects, and so on. If an object contains no other objects (i.e., the object has no "child" objects), it is a "leaf" object or "atomic."

An object in GRS can have properties. Such properties are the already mentioned "atomic," and "has_style," both described more in detail hereinbelow.

An object which has the property "atomic" contains no child objects, and may be a text object, a contour object, a linework pixel (LP) object, or a continuous tone (CT) object. Such an object is renderable if it has the property "has_style." To be a renderable object, the object must have geometrical parameters so that the rendering device (e.g., the RIP) knows "where" the object is to be rendered and possibly one or more (render) attributes. The geometrical parameters for a contour object are mainly the coordinates of the points describing the path of that contour object, while for a text object the geometrical parameters are mainly the text characters, the font parameters, the starting point of the text. In GRS, a renderable object can have no attributes, which means that while it is renderable, it will not be rendered. Examples of attributes are fill and stroke. Note that while the preferred embodiment supports only text objects containing a fill attribute and contour objects containing a stroke attribute, a fill attribute, or both stroke and fill attributes, the inventive method is not restricted to that. For example, in GRS, LP elements may be anything, including high resolution scans of pre-halftoned areas. Coverage area compensation would be applicable to such areas as well, so long as the imagesetter resolution is at least an order of magnitude larger than the LP resolution, and how to modify the method described herein to perform such compensation would be straightforward to one of ordinary skill in the art.

The one or more attributes of an atomic object may have one or more properties, called attribute properties, or may have no property. An attribute of a renderable element in GRS may include an attribute property called "spread and choke" ("sac,") with an amount indicating the spread-and-choke amount. The default sac amount is zero. Fill, stroke and text attributes, for example, include the sac attribute property. The sac value instructs the RIP to spread or choke the object by the sac value. The attribute sac normally is used for implementing a procedure known in the art as trapping, but it is used herein for implementing the coverage area gain compensation. Trapping is described in more detail hereinunder.

Another possible attribute property is "pai," being a paint. The word paint as used herein means a color used in the document, usually described as a combination of one or more ink-colors at particular specified percentages. In GRS, pai is indicated by a number (an index). In the preferred embodiment for security printing, each possible pai number refers to a single one of the set of inks used for printing. That is, all elements are printed at 100% ink coverage with a single ink.

Some examples of objects in GRS are shown in Table 1 below.

Figure 6:
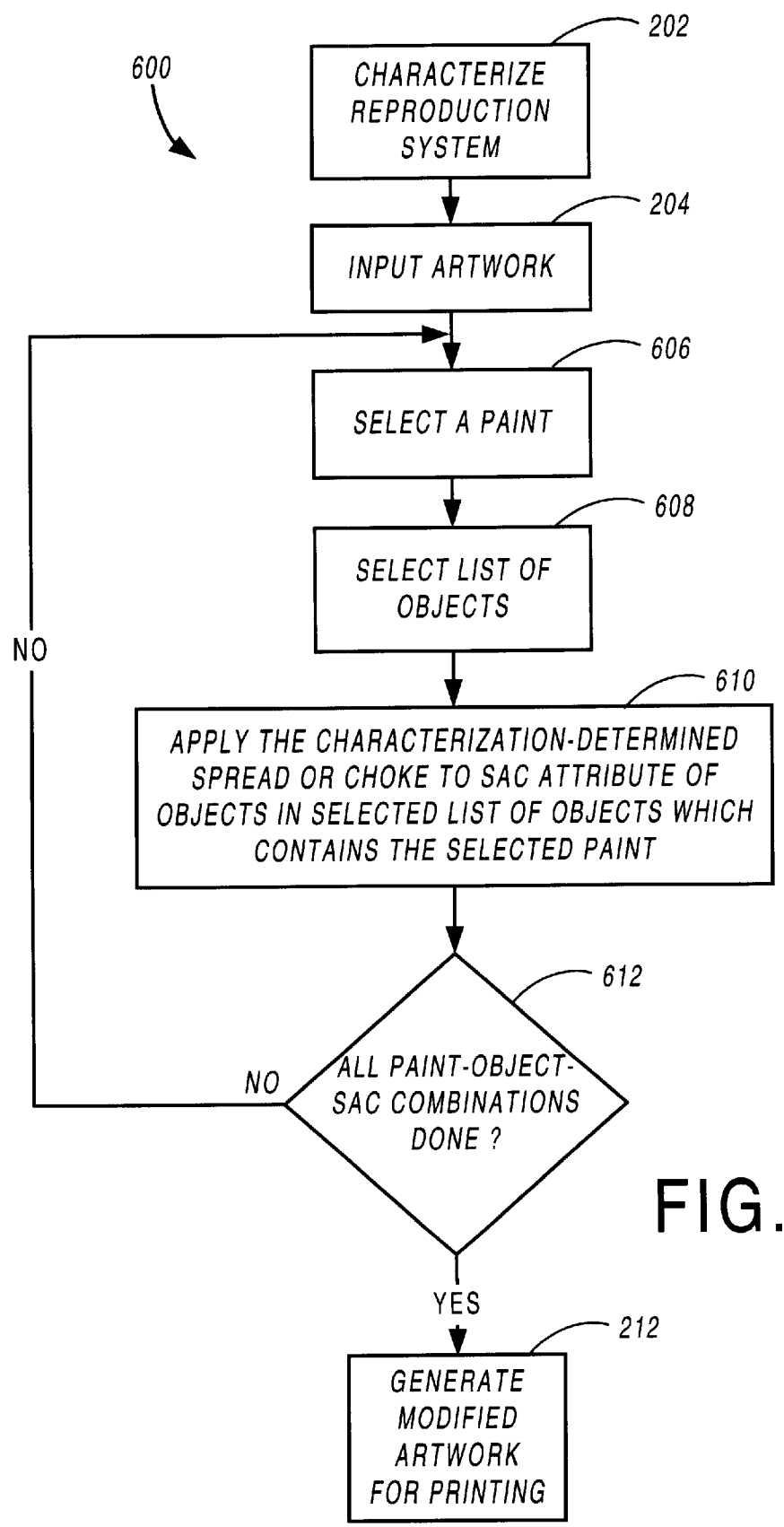
FIG. 6 shows a flow chart of the preferred embodiment of the method for applying the enlargement ("spread") or contraction ("choke") to selected elements of the artwork.

FIG. 6 shows a flow chart for the preferred embodiment for applying the spread and choke values according to the smear distances determined in the characterization step 202 for the inks in the artwork which is input in step 204. The method of the preferred embodiment works on one ink at a time. Step 606 selects the ink (pai value). In the general embodiment, not all of the objects are subject to the spread and choke. Step 608 selects the list of objects in the artwork. For security printing applications, the list of objects is typically, but not necessary, the list of all objects in the artwork, since all artwork is filled linework (possibly with a stroke attribute). In other implementations, the list can be a list of attributes to look for, for example, 100% fill, stroke, text, and so forth. In one implementation, the objects to look for may be set by the user using user interface 140 (FIG. 1B). Step 610 retrieves the atomic objects, and of the attributes of these atomic objects, the attribute properties "sac" when present are modified appropriately. The method of this embodiment includes the modification of spread-and-choke attribute properties of all atomic objects of the list of objects which go together with the specified paint attribute "pai."

TABLE 1

| Object | Geometrical Parameters | Attributes and Properties |
| --- | --- | --- |
| A light green curve with a line thickness of 3 mm | Curve of sequential set of (x, y) coordinates of vectors of Bezier curves | One attribute, having two properties being "line thickness 3 mm" and "paint light green." |
| A red, bold and italicized character "e" | Text is "e," font is "Courier bold italic 10 pt", starting at location (7.5, 6.0) | One attribute, being having properties "fill in red" |
| A rectangle which is filled blue and has a yellow 1 mm border (stroked) | rectangle described by coordinates of four corner points | A first attribute referring to the blue filling having property "fill in blue"; and a second attribute being a stroke having properties "line thickness 1 mm" and "paint yellow" |

"Pseudocode 1" below shows C-like pseudocode for the preferred embodiment computer program for carrying out the modification. The pseudocode below represents a computer program with elements of the computer program corresponding to what is described shown within square brackets. The program includes a main procedure called ODL_set_paint_sac, a procedure called OBJ_set_sac for setting all sac values, and a procedure called OBJ_set_paint_sac for setting only the sac values which go together with a paint "pai" in the same attribute property. References to procedures within the program are within asterisks (*) in the pseudocode. The property "atomic" is checked in the program by a function "int OBJ_is_atomic (object ob)," while the property "has_style" is checked in the program by a function "int OBJ_has_style (object ob)."

---

Pseudocode 1

---

For a selected list of objects, a yes or not selected paint [pai],
  and with a selected spread-and-choke value [sac];
 Code of ODL_set_paint_sac 
if a paint is selected [if (pai)]
    for every object in the list
    [ODL_all_objects (odl)];
         Code of OBJ_set_paint_sac 
        if the object is renderable
        [OBJ_has_style (ob)];
            for every attribute in the object
            [OBJ_all_attributes (ob)];
                which has an attribute property paint
                equal to the selected paint
                [ap = ATR_get_paint_info (attr)
                    if (ap && ap->pai==pai)];
                    set sac value, to the selected sac
                    [ATR_set_sac (attr, sac)];
        if the object is not renderable [!OBJ_has_style(ob)],
            iterate over the child objects of the object
            [OBJ_all_childobj (ob)];
                for a child object, recursively call
                OBJ_set_paint_sac
                [OBJ_set_paint_sac (childobj, sac, pai)];
if no paint is selected (else);
    for every object in the list
    [ODL_all_objects (odl)];
         Code of OBJ_set_sac 
        if the object is renderable
        [OBJ_has_style (ob)];
            for every attribute in the object
            [OBJ_all_attributes (ob)];
                set sac value, to the selected sac
                [ATR_set_sac (attr, sac)];
        if the object is not renderable [!OBJ_has_style(ob)];
            iterate over the child objects of the object
            [OBJ_all_childobj (ob)];
                for a child object, recursively call
                OBJ_set_sac [OBJ_set_sac (childobj, sac)];

---

The procedure is repeated for each of the inks for each of the elements selected according to whether they are candidates for coverage gain effects. If, for example, there are four inks, and the artwork consists only of line elements of solid ink, then the modification of the sac attribute occurs four times with four sets of objects. The smear distance may be different for each of the inks depending on the results of the characterization of the reproduction system. In security applications, there are typically between one and eight inks, and indeed all elements are line elements of solid ink, some of which may be the halftone elements used for non-traditional halftoning.

RIPping the Modified Artwork

Once the sac values are modified, the result is modified artwork 144, which is then raster image processed, and the results used to reproduce the artwork on the particular press using the particular inks on particular paper.

The preferred embodiment uses a raster image processor (RIP) for GRS that can raster image process (also "RIP"), i.e., convert to a raster, graphic elements that include a spread-and-choke value different from zero, including spreading or choking the objects by a required amount.

GRS includes a standard measurement unit called a "graphic unit." The value of a graphic unit is defined in the header of a GRS file, and might be, for example, 1/100,000 inch. The sac values are provided in such units. The RIP converts these units into pixels according to the RIP resolution. For example, when RIPping to a 10,000 dpi resolution device, one pixel is 10 graphic units when a graphic unit is 1/100,000 inch.

The Barco Graphics RIP applies the sac value to spread or choke an element, for example, a path element or text element by the amount specified. The sac value is perpendicular to the contour, and the RIP converts this to a shift in both the x and y.

The following describes, as an example, how those objects that are available as graphic paths, are handled by the RIP to implement spread and choke.

Generation of a Positive Winded Path

Starting with the original path, the first step is generating a modified "positive winded" path, that is, a path that would be RIPped to the same image as the original path, but that obeys the positive winding number rule. Thus, RIPping the modified path results in the same image as ripping the original path, and the modified path does not overlap with itself. A property of a positive winded path such as the modified path is that filled parts of the path are oriented clockwise, and non-filled holes are oriented counterclockwise.

According to the positive winding number rule, a point is inside a path (i.e., is filled) if it has a positive winding number determined as follows: drawing a ray from that point to infinity in any direction and starting with a count of 0, add 1 each time a path segment crosses the ray from left to right, and subtract 1 every time the segment crosses from right to left. If after counting the crossings, the number is positive, it is inside the path. If it is zero or negative, it is outside the path. An alternate to a positive winded path is a path defined according to a negative or zero winded or an even odd winding number rule. With an even odd winding number rule, the insideness of a point is determined by drawing a ray from the point in any direction to infinity, and simply counting the number of path segments that cross the ray, regardless of direction. If the number is odd, the point is inside, and if even, the point is outside. Thus, consider a doughnut shape such as the font for the letter "O." When formed by an even-odd winded path, the path consists of two parts, an outer circle and an inner circle, both oriented clockwise. In the modified path (a positive winded path) that represents the same "O" is formed, the outer circle is oriented clockwise, while the inner circle, which represent the hole in the "O," is oriented counterclockwise. For a discussion of winding numbers and filling rules, see, for example, Adobe Systems Incorporated: PostScript Language Reference Manual, (Third Edition), Reading, Mass: Addison-Wesley, 1999.

Generate the Parallel Path

The positive winded path generated in step 1 has the property that, traversing the path, there is a fill on the right-hand side of the path and no fill on the left-hand side of the path. To implement a spread (represented by a positive spread-and-choke value), a parallel path on the left-hand side of the positive winded path at a distance defined by the spread-and-choke value is generated. In the case of a choke (represented by a negative spread-and-choke value), a parallel path on the right-hand side of the positive winded path at a distance defined by the absolute spread-and-choke value is generated.

RIPping the Parallel Path

The final step involves RIPping the parallel path using the positive winding number rule. The positive winding rule is used because the parallel path could contain overlapping parts. That is, when the original path contains two parts that are close to each other, the two corresponding parts in the resulting parallel path could overlap, and RIPping according to the even-odd winding rule could then result in unexpected holes. RIPping according to the positive winded rule assures the correct result is obtained.

Alternate RIPs

A first alternate implementation is applicable to RIPS that are not able to understand the sac attribute of GRS and do not have the ability to automatically apply the spread and choke. In this first embodiment, as a pre-processing step prior to RIPping, for each ink value ("pai" in this embodiment), separate spread and choke regions are generated.

Generating separate spread and choke regions for pre-defined graphic element's is a procedure used in a process known in the art as trapping. Trapping is used in the art to solve the problem of misregistration that occurs when printing a set of separations. In this context, trapping refers to expanding (i.e., spreading) regions of a particular color beyond its normal boundaries, or contracting ("choking") a color region so that a small overlap exists between graphic objects where registration may occur and might otherwise produce visible artifacts. While historically, trapping was implemented manually, recently automatic trapping programs have been introduced. Automatic trapping comprises three steps: 1) analysis, which includes determining overlapping objects in artwork and making trapping decisions on the edges of overlapping objects, and 2) based on the results of the analysis, applying or not applying a choke or spread to one of the overlapping objects. There are various methods available for implementing the spread or choke. One method of applying trap of a particular width to an object boundary defined by a path is to apply a stroke attribute to the path of the boundary, the stroke being of the desired trap width and trap color.

A method similar to that used in implementing the spread or choke for trapping may be beneficially used in an alternate embodiment of the invention which does not use a RIP that understand sac values.

Each ink value is processed separately. For each ink defined by paint "pai," the artwork for that ink value pai is first flattened to generate contours (paths) to describe all filled elements. To implement a spread value (positive sac), a stroke attribute having the color pai is then added to each of the paths of the elements, the stroke having a thickness twice the sac value. To implement a choke, a stroke attribute having the color white is added to each of the elements, the stroke having a thickness twice the sac value.

In an improved implementation, rather than a simple stroke attribute being added to the paths, a frame is added (for a spread) or subtracted (for a choke) around the path in such a manner that which that does not extend over more than half the local thickness of the object. This avoids the large unwanted spike that would be generated around a sharp corner if only a stroke attribute was added to the path to implement the spread or choke. Such mean of adding shaped frames are known, for example, in trapping, and are sometimes called "mitered trapping" and "centerline trapping."

Variable Smear Distances

Another aspect of the invention is applicable for very small line segments of thickness less than about 50 $\mu$m. Compensating for coverage gain by spreading or choking by a fixed distance may no longer provide accurate results. In this aspect, the step of characterizing the reproduction system determines a relationship between the smear distance for each ink of the reproduction system and the thickness of a line element of constant ink value. The relationship preferably is a table of thicknesses and smear distances for each thickness in the table.

FIG. 3B shows a first alternate 310-for characterization step 202 applicable when it is desired to more accurately compensate for coverage gain effects, including applying compensation to very thin lines for which the fixed smear distance model may not be sufficiently accurate. In this variation, step 312 includes generating a test object that includes lines of various thicknesses, the thicknesses in a range where the smear distance may vary with line thickness (e.g., line thickness much less than approximately 100 $\mu$m, for example, less than 50 $\mu$m). Step 314 includes imaging the test object using the imaging part of the reproduction system (e.g., system 100), and step 316 includes reproducing the test object using each of the colorants (inks) and using the paper of the reproduction system. Step 318 includes measuring the line thicknesses as a function of the designed line thicknesses. The spread distance as a function of line thickness is determined as a table using the measurement for each colorant for the paper of interest.

Referring again to FIG. 4, test elements 407 (shown enlarged) includes a set of positive and negative lines of varying thicknesses, and these can be used to determine a table of smear distance to line thickness using the method of FIG. 3B.

In step 206 (FIG. 2) of causing the spread or choke, each of the linework elements of constant ink value is selected as a candidate for compensation. Step 206 further includes, for each particular ink and for each selected linework element of the particular ink, determining the local thickness of the linework element at each location of the linework element, and causing the spread or choke by the smear distance for the particular ink according to the relationship determined in characterization step 202. In one implementation, the relationship determined in characterizing step (a) comprises a set of local distances and a corresponding set of smear distances comprising a smear distance for each of the set of local thicknesses for each of the inks. This is provided as a table. The smear distance for the determined local thickness is obtained by interpolation using the set of corresponding smear distances.

Implementing Compensation on Pixel Data

While the preferred embodiment of coverage grain compensation program 142 analyzes the data and causes the spread and choke to data defined on some object-oriented graphic format, in an alternate embodiment, the coverage grain compensation is carried out on data provided as pixel data. The original artwork, for example, may first be RIPped and provided in pixel data format, or the original artwork may have been provided in pixel data format by a graphic design program that operates in the pixel domain, such as Adobe Photoshop® from Adobe Systems Incorporated, San Jose, Calif., or may have been obtained in pixel format by scanning a manually produced master of the artwork.

In accordance with the pixel-data oriented implementation, the artwork is provided as a set of pixel-data formats, typically in raster formats, one for each of the inks used in printing. That is, as pixel data separations. Each of the pixel-data separation formats is modified individually by causing a spread or choke to selected regions. The steps for modifying each separation include: 1) determining boundaries; 2) from the boundaries, identifying one or more regions of constant ink value; 3) for each region, causing a spread or choke by expanding or contracting the region. Expanding or contracting is by modifying the location of each boundary pixel by amounts in both the x and y coordinate direction such that the boundary contracts or expands in a direction perpendicular to the tangent of the boundary at the boundary pixel of interest. The contraction or expansion distance is the smear distance for that particular ink of the separation. Methods for each of these steps are well known in the art of image processing. Also such methods are used in the spread and choke implementation steps of pixel-oriented automatic trapping techniques. See for example, the method of Yosefi, described in U.S. Pat. No. 5,113,249, which makes use of scanned data, and processes each raster line of pixels in order, comparing for each pixel three pixels from the previous scan line and two pixels from the same line to determine if a color change has occurred. The boundary is so generated. Similarly, the method described by Bjorge, et al., in U.S. Pat. No. 5,295,236 makes use of a pixel data oriented approach to trapping, in which PostScript data is first rasterized into pixel-data, and the results are analyzed for making trapping decisions, including determining boundaries between regions.

Operation for Printing Security Printing on Several Printing Presses

One application of the invention is reproducing the same artwork on a variety of reproduction systems that each produce a different coverage gain effect. One characterizes each of the reproduction systems, and then produces modified artwork for each of the reproduction systems, for example, using coverage area compensation program 142 (FIG. 1B). The modification to form the modified artwork for any reproduction system includes the steps of the embodiment shown in FIG. 2. A spread or choke is caused to one or more selected graphic elements of the artwork by an amount determined according to the results of the characterization step for the particular reproduction system, and the modified artwork for on any particular reproduction system is then reproduced on that particular reproduction system. This reduces variations in coverage gain effects between the reproductions of the artwork on the different reproduction systems.

Using the invention in this way is particularly useful for reproducing security documents that include small linework elements that might be the halftone elements in a non-traditionally halftoned region on a security document. For such an application, the artwork is usually very high resolution artwork, and reproduction therefore may include imaging on a very high resolution imagesetter.

The present invention is in no way limited to the forms of embodiment described by way of examples hereinabove and represented in the enclosed drawings. However, the present method and system may be realized according to different variants, without leaving the scope of the invention, which is to be construed by the claims and their legal equivalents.

What is claimed is:

1. A method of compensating artwork for coverage gain that occurs during reproducing of the artwork on a reproduction system, the artwork including one or more graphic elements, the method comprising:

(a) characterizing the reproduction system; and
    (b) selecting one or more graphic elements of the artwork;
    (c) automatically modifying the artwork by causing a spread or choke to the selected graphic elements of the artwork by an amount determined according to the results of the characterization step,
    whereby reproducing the modified artwork on the reproduction system reduces the coverage gain effects.

2. The method of claim 1, wherein the one or more selected graphic elements include one or more linework elements.

3. The method of claim 2, wherein the selected linework elements include the elements of a non-traditional halftoning technique.

4. The method of claim 1, wherein the artwork comprises pixel data, wherein the step of selecting further comprises:
    identifying regions of constant ink value in the pixel data,
    and wherein the causing a spread or choke operation in the step of modifying comprises causing a spread or choke operation to the graphic elements defined by the regions, the causing of a spread or choke being by changing the area of the regions.

5. The method of claim 1, wherein the artwork is provided in an object-oriented graphic format, wherein reproducing the artwork comprises RIPping the artwork.

6. The method of claim 5, wherein causing the spread or choke of an element in modifying step (c) includes marking the element for enlargement or contraction during RIPping.

7. The method of claim 5, wherein causing the spread or choke of an element in modifying step (c) includes enlarging or contracting the boundaries of the element.

8. The method of claim 5, wherein causing the spread or choke of an element in modifying step (c) includes, for an element described by a path, adding a stroke attribute to the contour of an element not having the stroke attribute.

9. The method of claim 5, wherein causing the spread or choke of an element in modifying step (c) includes, for an element described by a path, replacing the path of the elements by another parallel path.

10. The method of claim 5, wherein causing the spread or choke of an element in modifying step (c) includes for an element that has a contour with a stroke attribute, modifying the stroke attribute of the contour of the element.

11. The method of claim 1, where the choke or spread is by an amount in the range of 1 to 200 $\mu$m.

12. The method of claim 1, where the choke or spread is by an amount in the range of 1 to 50 $\mu$m.

13. The method of claim 12, further including the step of:
    (d) reproducing the artwork on the reproduction system,
    wherein the reproduction system includes a very high resolution imagesetter.

14. The method of claim 1,
    wherein the characterizing step (a) determines a fixed smear distance for each ink of the reproduction system; and
    wherein step (b) further includes
        selecting as the selected elements all linework elements of constant ink value,
    and wherein step (c) of modifying further includes:
        for each particular ink and for each selected linework element of the particular ink, causing the spread or choke by the fixed smear distance for the particular ink.

15. The method of claim 1,
    wherein the characterizing step (a) determines a relationship between the smear distance for each ink of the reproduction system and the thickness of a line element of constant ink value; and
    wherein step (b) further includes
        selecting as the selected elements all linework elements of constant ink value,
    and wherein step (c) further includes
        for each particular ink and for each selected linework element of the particular ink, determining the local thickness of the linework element at each location of the linework element, and causing the spread or choke to be by the smear distance for the particular ink for the determined local thickness.

16. The method of claim 15, wherein the relationship determined in characterizing step (a) comprises a set of local distances and a corresponding set of smear distances comprising a smear distance for each of the set of local thicknesses for each of the inks, and wherein the smear distance for the determined local thickness is obtained by interpolation over the set of corresponding smear distances.

17. The method of claim 1, wherein the one or more selected graphic elements include one or more elements having 100% ink.

18. The method of claim 17, wherein the artwork includes at least one element having less that 100% ink coverage that is traditionally halftoned, the method further including the step of:

(d) compensating the element in the artwork that has less than 100% ink and that is traditionally halftoned using a dot gain compensation technique.

19. The method of claim 18,
wherein the step of characterizing includes determining a smear distance for each ink in the artwork,
wherein the spread or choke caused to each 100% ink element in modifying step (c) is by the smear distance for the ink;
wherein the one or more selected graphic elements include the element having less that 100% ink coverage that is traditionally halftoned, and
wherein the spread or choke caused to the element having less that 100% ink coverage that is traditionally halftoned is by the smear distance for the ink.

20. The method of claim 18,
wherein the step of characterizing includes determining a smear distance for each ink in the artwork,
wherein the spread or choke caused to each 100% ink element in modifying step (c) is by the smear distance for the ink;
wherein the one or more selected graphic elements include the element having less that 100% ink coverage that is traditionally halftoned, and
wherein the spread or choke caused to the element having less that 100% ink coverage that is traditionally halftoned is by the smear distance for the ink reduced by an amount dependent on the ink coverage.

21. The method of claim 20 wherein the amount the smear distance is reduced by is approximately proportional to the local reduction in % ink fill.

22. The method of claim 1, wherein the artwork is for a security document and the reproduction system is for reproducing the artwork to produce one or more security documents.

23. The method of claim 1, wherein selection step (b) is automatic.

24. The method of claim 1, wherein selection step (b) is interactive.

25. A design system for preparing artwork for reproduction on a reproduction system, the design system comprising:

(a) a computer;
(b) a graphic design program configured when run on the computer to produce artwork for reproduction from input data, the input data including a set of one or more graphic elements; and
(c) a coverage gain compensation program connected to the graphic design program and configured when run on the computer to cause a spread or choke to one or more selected graphic elements of the set of graphic elements, the spread and choke such that reproducing the artwork reduces the coverage gain effects on the selected graphic elements.

26. A design system for preparing artwork including a set of one or two graphic elements for reproduction on a reproduction system, the design system comprising:

(a) a computer;
(b) a coverage gain compensation program configured when run on the computer to cause a spread or choke to one or more selected graphic elements of the set of graphic elements, the spread and choke such that reproducing the artwork reduces the coverage gain effects on the selected graphic elements.

27. The design system of claim 26, wherein the amount of spread or choke is according to a characterization of the reproduction system.

28. A method of reproducing artwork on a plurality of reproduction systems, the artwork including one or more graphic elements, the method comprising:

(a) characterizing the reproduction systems; and
(b) modifying the artwork for each particular reproduction system by causing a spread or choke to one or more selected graphic elements of the artwork by an amount determined according to the results of the characterization step, the modifying producing modified artwork for the particular reproduction system; and
(c) reproducing on any particular reproduction system the modified artwork therefor,
whereby reproducing each particular reproduction system the modified artwork therefor reduces variations in coverage gain effects between the reproductions of the artwork on the reproduction systems.

29. The method of claim 28, wherein the one or more selected graphic elements are linework elements.

30. The method of claim 29, wherein the linework elements are the elements of a non-traditional halftoning technique.

31. The method of claim 28, where the choke or spread is by an amount in the range of 1 to 50 µm.

32. The method of claim 31, wherein the reproduction system includes a very high resolution imagesetter.

33. The method of claim 31, wherein the artwork if for a security document.

* * * * *